United States Patent
Deshpande (10) Patent No.: US 9,644,515 B2
(45) Date of Patent: May 9, 2017

(54) GASEOUS AMMONIA INJECTION SYSTEM

(71) Applicant: Cummins Emission Solutions, Inc., Columbus, IN (US)

(72) Inventor: Hemant Deshpande, Pune (IN)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/667,314

(22) Filed: Mar. 24, 2015

(65) Prior Publication Data
US 2016/0281566 A1    Sep. 29, 2016

(51) Int. Cl.
*F01N 3/20*    (2006.01)

(52) U.S. Cl.
CPC ........ *F01N 3/2066* (2013.01); *F01N 2240/02* (2013.01); *F01N 2240/16* (2013.01); *F01N 2610/02* (2013.01); *F01N 2610/06* (2013.01); *F01N 2610/10* (2013.01); *F01N 2610/1406* (2013.01)

(58) Field of Classification Search
CPC ...... F01N 3/2066; F01N 5/02; F01N 2240/25; F01N 2610/02
See application file for complete search history.

(56) References Cited

U.S. PATENT DOCUMENTS

| | | | |
|---|---|---|---|
| 6,361,754 B1 * | 3/2002 | Peter-Hoblyn | B01D 53/90 422/169 |
| 6,436,359 B1 | 8/2002 | Spencer et al. | |
| 7,416,715 B2 | 8/2008 | Spokoyny | |
| 8,293,201 B2 | 10/2012 | Casara et al. | |
| 8,313,722 B2 | 11/2012 | Spencer et al. | |
| 8,387,368 B2 | 3/2013 | Parmentier et al. | |
| 8,615,985 B2 * | 12/2013 | Bruck | F01N 3/2066 60/286 |
| 2003/0211024 A1 | 11/2003 | Wojichowski | |

(Continued)

FOREIGN PATENT DOCUMENTS

| | | | | |
|---|---|---|---|---|
| DE | 3320754 A | * | 2/1984 | |
| GB | WO 2008065390 A1 | * | 6/2008 | ........... F01N 3/2066 |
| WO | WO-2012/104205 | | 8/2012 | |

OTHER PUBLICATIONS

"32.5% Automotive Grade Urea Solution (Hereinafter AUS 32) According to ISO 22241," Quality Assurance Guidance Document, Cefic Automotive Grade Urea, Sep. 20, 2011, 22 pages.

(Continued)

*Primary Examiner* — Audrey K Bradley
(74) *Attorney, Agent, or Firm* — Foley & Lardner LLP (57) ABSTRACT

An aftertreatment system comprises a liquid exhaust reductant tank. A heat exchanger is positioned downstream of the preheater. The heat exchanger heats the liquid exhaust reductant to a second temperature. The second temperature is sufficient to decompose the liquid exhaust reductant and produce ammonia gas. A storage tank is positioned downstream of the heat exchanger and is structured to store the ammonia gas at a predetermined pressure. The aftertreatment system also includes a selective catalytic reduction system positioned downstream of the storage tank. The aftertreatment system can also include a preheater positioned downstream of the liquid exhaust reductant tank and upstream of the heat exchanger.

19 Claims, 8 Drawing Sheets

(56) References Cited

U.S. PATENT DOCUMENTS

| | | | | |
|---|---|---|---|---|
| 2008/0279732 | A1* | 11/2008 | Coates | B01D 53/90 422/148 |
| 2008/0307967 | A1 | 12/2008 | Coates et al. | |
| 2008/0314027 | A1 | 12/2008 | Barber et al. | |
| 2009/0107116 | A1 | 4/2009 | Barber et al. | |
| 2009/0120079 | A1* | 5/2009 | Buckberry | B01D 53/56 60/303 |
| 2011/0283677 | A1 | 11/2011 | Kaefer | |
| 2012/0110986 | A1* | 5/2012 | Vorsmann | C01C 1/086 60/295 |
| 2013/0104519 | A1 | 5/2013 | Zhang et al. | |
| 2013/0213511 | A1 | 8/2013 | Yukimura et al. | |
| 2015/0231565 | A1* | 8/2015 | Wittrock | B01D 53/9477 423/212 |

OTHER PUBLICATIONS

"Flue Gases Properties Table—Density, Viscosity," www.pipeflowcalculations.com, http://www.pipeflowcalculations.com/tables/flue-gas.php, No date available, but at least as early as Jul. 15, 2014, the date of the inventor's notes, 1 page.

"Urea," NIST, National Institute of Standards and Technology, Material Measurement Laboratory, http://webbook.nist.gov/cgi/cbook/cgi?ID-C57136&Mask=4#Thermophase, No Date Available, but at least as early as Jul. 15, 2014, the date of the inventor's notes, 1 page.

Mukherjee, Rajiv, "Effectively Design Shell-and-Tube Heat Exchangers," Chemical Engineering Progress, Feb. 1998, Engineers India Ltd. 17 pages.

Shawabkeh, Reyad, "Steps for Design of Heat Exchanger," Department of Chemical Engineering, King Fahd University of Petroleum & Minerals, No Date Available, but at least as early as Jul. 15, 2014, the date of the inventor's notes. 10 pages.

Teir, Sebastian et al. "Thermal Design of Heat Exchangers," Helsinki University of Technology, Department of Mechanical Engineering, Steam Boiler Technology E-Book, Espoo 2002, 24 pages.

Whitelaw, Jim H., "Convective Heat Transfer," http://www.thermopedia.com/content/660/, Feb. 2, 2011, 10 pages.

* cited by examiner

FIG. 8

GASEOUS AMMONIA INJECTION SYSTEM

TECHNICAL FIELD

The present disclosure relates generally to exhaust aftertreatment systems for use with internal combustion (IC) engines.

BACKGROUND

Exhaust aftertreatment systems are used to receive and treat exhaust gas generated by engines (e.g., IC engines). Conventional exhaust gas aftertreatment systems include any of several different components to reduce the levels of harmful exhaust emissions present in exhaust gas. For example, certain exhaust aftertreatment systems for diesel-powered IC engines include a selective catalytic reduction (SCR) catalyst to convert NOx (NO and NO$_2$ in some fraction) into harmless nitrogen gas (N$_2$) and water vapor (H$_2$O) in the presence of ammonia (NH$_3$). Generally in such conventional aftertreatment systems, an exhaust reductant, (e.g., a diesel exhaust fluid such as urea) is injected into the aftertreatment system to provide a source of ammonia, and mixed with the exhaust gas to partially reduce the NOx gases. The reduction byproducts of the exhaust gas are then fluidically communicated to the catalyst included in the SCR aftertreatment system to decompose substantially all of the NOx gases into relatively harmless byproducts which are expelled out of such conventional SCR aftertreatment systems.

In conventional aftertreatment systems, liquid exhaust reductant is atomized into droplets and inserted into a stream of exhaust gas. Conventional aftertreatment systems therefore generally include exhaust reductant dosing modules which include actuators, atomizers (e.g., air assisted injectors), and other components to produce a desired droplet size which can efficiently mix with the stream of exhaust gas. The liquid reductant droplets can however, crystallize and deposit on the walls or catalyst of the SCR system, or otherwise the components of the aftertreatment system. This can reduce the efficiency of the aftertreatment system, increase backpressure experienced by the exhaust gas, lead to increased NOx emissions and increase in warranty claims. Therefore conventional aftertreatment systems include complex technologies for producing exhaust reductant droplets having a desired size to obtain optimum evaporation, and reduce exhaust reductant deposits which adds complexity and increases the overall cost of the aftertreatment system.

SUMMARY

Embodiments described herein relate generally to exhaust aftertreatment systems for use with IC engines, and in particular to exhaust aftertreatment systems that include an ammonia gas generation module for producing ammonia gas from a liquid exhaust reductant for delivering to an SCR system.

In some embodiments, an aftertreatment system comprises a liquid exhaust reductant tank. A heat exchanger is positioned downstream of the liquid exhaust reductant tank. The heat exchanger heats the liquid exhaust reductant to a second temperature. The second temperature is sufficient to decompose the liquid exhaust reductant and produce ammonia gas. A storage tank is positioned downstream of the heat exchanger and is structured to store the ammonia gas at a predetermined pressure. The aftertreatment system also includes a SCR system positioned downstream of the storage tank. In particular embodiments, the aftertreatment system also includes a preheater positioned downstream of the exhaust reductant tank and upstream of the heat exchanger In other embodiments, an ammonia gas generation module comprises a liquid exhaust reductant tank. A preheater positioned downstream of the exhaust reductant tank to heat the liquid exhaust reductant to a first temperature. A heat exchanger is positioned downstream of the preheater. The heat exchanger heats the liquid exhaust reductant to a second temperature. The second temperature is sufficient to decompose the liquid exhaust reductant and produce ammonia gas. A storage tank is positioned downstream of the heat exchanger and in fluid communication with an SCR system. The storage tank is structured to store the ammonia gas at a predetermined pressure.

In still other embodiments, a method for treating an exhaust gas using an aftertreatment system which includes at least an exhaust reductant tank, a preheater, a heat exchanger, a storage tank and a SCR system, comprises transferring a liquid exhaust reductant from the exhaust reductant tank to the heat exchanger through the preheater. The liquid exhaust reductant is preheated in the preheater to a first temperature. The liquid exhaust reductant is heated in the heat exchanger to a second temperature. The liquid exhaust reductant is decomposed to produce ammonia gas. The ammonia gas is delivered to the storage tank from the heat exchanger. The ammonia gas is delivered to the SCR system from the storage tank on demand. The ammonia gas is mixed with an exhaust gas, thereby reducing the exhaust gas in the selective catalytic reduction system.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

BRIEF DESCRIPTION OF DRAWINGS

The foregoing and other features of the present disclosure will become more fully apparent from the following description and appended claims, taken in conjunction with the accompanying drawings. Understanding that these drawings depict only several implementations in accordance with the disclosure and are therefore, not to be considered limiting of its scope, the disclosure will be described with additional specificity and detail through use of the accompanying drawings.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION OF VARIOUS EMBODIMENTS

Embodiments described herein relate generally to exhaust aftertreatment systems for use with IC engines, and in particular to exhaust aftertreatment systems that include an ammonia gas generation module for producing ammonia gas from a liquid exhaust reductant for delivering to an SCR system.

Embodiments described herein may provide several advantages over conventional aftertreatment systems including, for example: (1) providing gaseous ammonia for mixing with the exhaust gas before delivering to an SCR system allowing better and more efficient mixing with exhaust gas relative to liquid exhaust reductant droplets; (2) eliminating air assisted injection systems and air requirement used in conventional exhaust reductant dosing modules thereby reducing the overall cost of the aftertreatment system; (3) reducing exhaust reductant deposits while providing better mixing thereby, enabling higher NOx conversion efficiency relative to conventional aftertreatment systems; (4) reducing complexity of aftertreatment systems thereby reducing product development time and cost; and (5) allowing flexibility of mounting directly on an engine.

Figure 1:
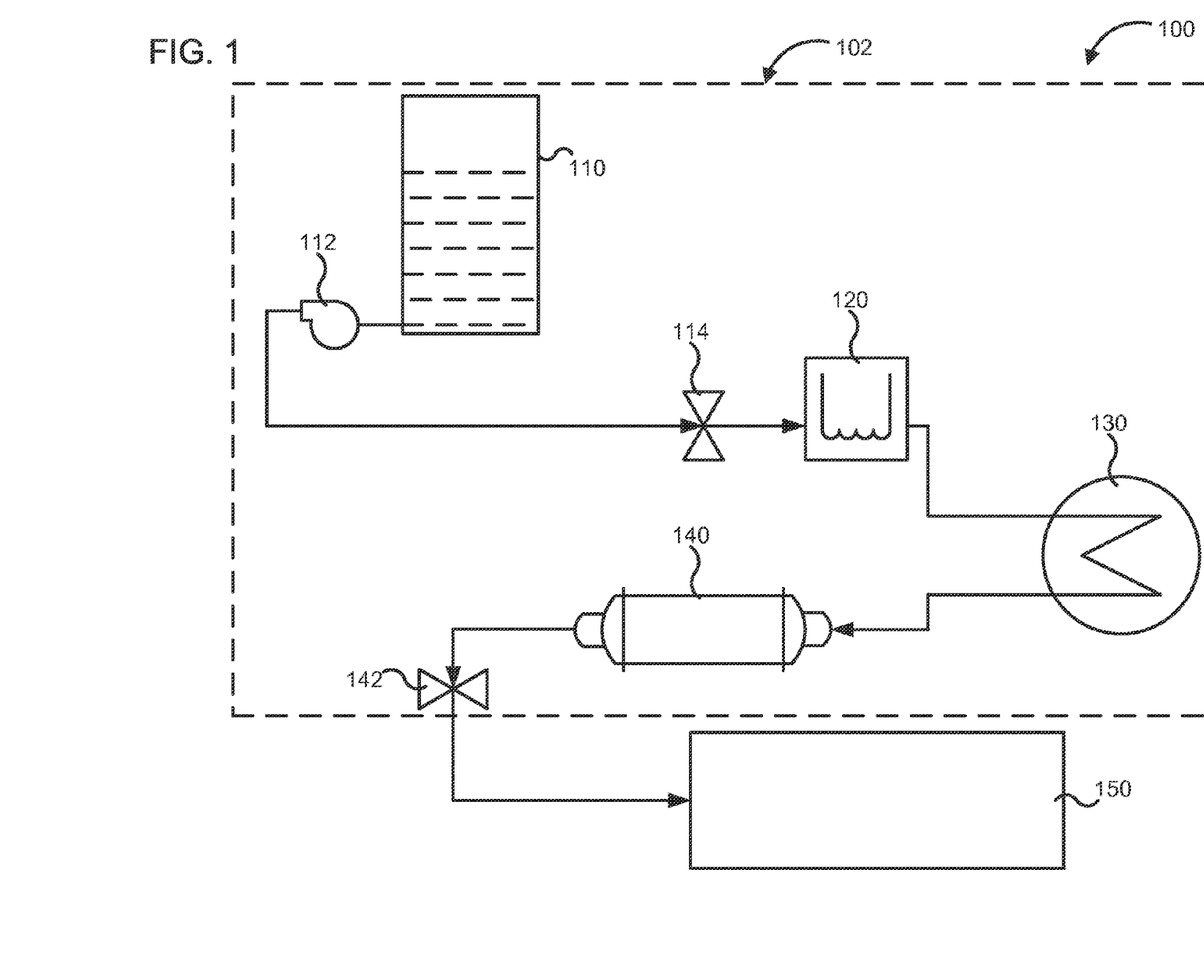
FIG. 1 is a schematic illustration of an aftertreatment system that includes an ammonia gas generation module, according to an embodiment.

FIG. 1 shows a schematic illustration of an aftertreatment system 100, according to an embodiment. The aftertreatment system 100 comprises an ammonia gas generation module 102 fluidly coupled to an SCR system 150 and configured to deliver ammonia gas to the SCR system 150. The ammonia gas generation module 120 includes at least an exhaust reductant tank 110, a preheater 120, a heat exchanger 130 and a storage tank 140. In some embodiments, the aftertreatment system 100 can be used for treating diesel exhaust gas in systems that include diesel engines (e.g., diesel powered vehicles, automobiles, trains, marine vessels, excavation equipment, industrial movers, etc.).

The exhaust reductant tank 110 is configured to store a volume of a liquid exhaust reductant. The exhaust reductant tank 110 can include a plastic tank, a metallic tank or any other suitable tank and can have any suitable shape or size. The liquid exhaust reductant can include a source of ammonia. For example, the liquid exhaust reductant can include an aqueous solution of urea or a commercially available diesel exhaust fluid (e.g., the diesel exhaust fluid sold under the trade name ADBLUE®). The liquid exhaust reductant can be formulated to be a liquid at room temperature but decompose above a predetermined temperature to generate ammonia gas, as described herein.

The preheater 120 is positioned downstream of the exhaust reductant tank 110. The preheater 120 is configured to preheat the liquid exhaust reductant to a first temperature before communicating to the heat exchanger 130. For example, the preheater 120 may be used to thaw or heat the exhaust reductant in cold conditions. In one embodiment, the preheater 120 can be used to increase the temperature of the liquid exhaust reductant so that less thermal energy is used in the heat exchanger 130 for producing the ammonia gas. In particular embodiments, the preheater 120 can include an electric heater. For example, the preheater 120 can include an induction coil heater or a resistive coil heater configured to provide heating when a current is passed through the coil.

The first temperature can be below a temperature at which the liquid exhaust reductant vaporizes or otherwise decomposes. For example, the first temperature can be in the range of 25 degrees Celsius to 95 degrees Celsius (e.g., about 25 degrees Celsius, 30 degrees Celsius, 40 degrees Celsius, 50 degrees Celsius, 60 degrees Celsius, 70 degrees Celsius, 80 degrees Celsius, 90 degrees Celsius or 95 degrees Celsius inclusive of all ranges and values therebetween).

In one embodiment, the liquid diesel exhaust fluid can be delivered to the heat exchanger 130 from the exhaust reductant tank 110 via gravity. In another embodiment, a feedpump 112 is positioned downstream of the exhaust reductant tank 110 and upstream of the preheater 120. The feedpump 112 can include a rotary pump, a vacuum pump, a positive displacement pump, a centrifugal pump, or any other suitable pump configured to communicate the liquid exhaust reductant to the heat exchanger 130 from the exhaust reductant tank 110 through the preheater 120.

In another embodiment, a first valve 114 is positioned upstream of the preheater 120 and downstream of the exhaust reductant tank 110 (e.g., downstream of the feedpump 112). The first valve 114 is configured to control a volume of the liquid exhaust reductant flowing to the preheater 120 and therefrom, the heat exchanger 130. In this manner, the first valve 114 can be used to control a flow rate of the liquid exhaust reductant to the heat exchanger 130. The first valve 114 can include any suitable valve, for example, a solenoid valve, a diaphragm valve, a ball valve any other suitable valve or a combination thereof.

The heat exchanger 130 is positioned downstream of the preheater 120. The heat exchanger 130 is configured to heat the liquid exhaust reductant to a second temperature which is sufficient to decompose the liquid exhaust reductant to produce ammonia gas. For example, an exhaust reductant that includes an aqueous urea solution has the chemical formula $((NH_2)_2CO).7H_2O)_n$. The urea solution can be decomposed by heating to a temperature of greater than 180 degrees Celsius to produce ammonia gas according to the following reactions:

$$((NH_2)_2CO).7H_2O)_n \rightarrow ((NH_2)_2CO)_n + 7H_2O \text{ (water evaporation)}$$

$$((NH_2)_2CO)_n \rightarrow HNCO + NH_3 \text{ (thermolysis of urea)}$$

$$HNCO + H_2O \rightarrow CO_2 + NH_3 \text{ (hydrolysis of isocyanic acid)}$$

As described in the above equations, heating of the liquid exhaust reductant to the second temperature initially dehydrates the reductant to remove water leaving concentrated urea. Continued heating of the exhaust reductant at the second temperature decomposes the urea to yield isocyanic acid and ammonia gas. The isocyanic acid then hydrolyzes at the second temperature to produce $CO_2$ and ammonia gas.

The second temperature is sufficient to decompose the liquid exhaust reductant and produce ammonia gas. In particular embodiments, the second temperature is greater than 180 degrees Celsius. For example, the second temperature can be 185 degrees Celsius, 200 degrees Celsius, 250 degrees Celsius, 300 degrees Celsius, 350 degrees Celsius, 400 degrees Celsius, 450 degrees Celsius, 500 degrees Celsius or 550 degrees Celsius inclusive of all ranges and values therebetween.

Any suitable heat exchanger can be used in the ammonia gas generation module 102. In some embodiments, the heat exchanger 130 can include a shell and tube heat exchanger. In a particular embodiment, the shell and tube heat exchanger can have a single tube in a spiral configuration configured to provide counter flow of the liquid exhaust reductant.

In some embodiments, a plurality of heat exchangers can be included in the aftertreatment system For example, a plurality of heat exchangers 130 can be fluidly coupled to the exhaust reductant tank 110 via the preheater. In such embodiments, the exhaust reductant is divided into a plurality of portions (e.g., equal volume portions) each portion flowing through a separate heat exchanger 130. Each portion of the exhaust reductant can be decomposed in the plurality of heat exchangers to produce ammonia gas which is then communicated to the storage tank 140, as described herein. In particular embodiments, the aftertreatment system 100 can include a plurality of storage tanks, with each of the plurality of storage tanks configured to store a portion of ammonia gas received from at least one of the plurality of heat exchangers.

In one embodiment, the heat exchanger 130 is fluidly coupled to an exhaust gas recirculation (EGR) system (not shown) which can be included in the assembly or otherwise system that includes the aftertreatment system 100. The heat exchanger 130 is configured to receive at least a portion of the exhaust gas from the EGR system. The portion of the exhaust gas can have a temperature such that the exhaust gas can provide sufficient heat to heat the liquid exhaust reductant to the second temperature. For example, the portion of the exhaust gas can have a temperature greater than 180 degrees Celsius (e.g., 185 degrees Celsius, 200 degrees Celsius, 250 degrees Celsius, 300 degrees Celsius, 350 degrees Celsius, 400 degrees Celsius, 450 degrees Celsius, 500 degrees Celsius or 550 degrees Celsius inclusive of all ranges and values therebetween.). The portion of the exhaust gas can then be recirculated back to the EGR system or provided to an engine.

In another embodiment, the heat exchanger 130 is fluidly coupled to an engine cooling system (not shown) which can be included in an assembly or otherwise system that includes the aftertreatment system 100. The heat exchanger 130 is configured to receive at least a portion of a coolant from the engine cooling system. The portion of the coolant can have a temperature such that the coolant can provide sufficient heat to heat the liquid exhaust reductant to the second temperature. For example, the portion of the coolant can have a temperature greater than 180 degrees Celsius (e.g., 185 degrees Celsius, 200 degrees Celsius, 250 degrees Celsius, 300 degrees Celsius, 350 degrees Celsius, 400 degrees Celsius, 450 degrees Celsius, 500 degrees Celsius or 550 degrees Celsius inclusive of all ranges and values therebetween).

Expanding further, the heat exchanger 130 can be fluidly coupled to the engine cooling system downstream of engine. The coolant is thus communicated to the heat exchanger 130 after accepting the heat from the engine so that the coolant is at a temperature on entering the heat exchanger 130 which is sufficient to heat the exhaust reductant to the second temperature. The portion of the coolant can then be recirculated back to the engine cooling system, for example communicated to a radiator included in the engine cooling system.

A storage tank 140 is positioned downstream of the heat exchanger 130. The storage tank 140 is structured to receive the ammonia gas from the heat exchanger 130 and store the ammonia gas at a predetermined pressure. For example, the storage tank 130 can include a pressure vessel structured to store ammonia gas at the second pressure. In some embodiments, the predetermined pressure can be greater than atmospheric pressure.

The SCR system 150 is configured to receive a mixture of the exhaust gas and the ammonia gas. The SCR system 150 includes one or more catalysts formulated to selectively treat the exhaust gas. Any suitable catalyst can be used such as, for example, platinum, palladium, rhodium, cerium, iron, manganese, copper, vanadium based catalyst, any other suitable catalyst, or a combination thereof. The catalyst can be disposed on a suitable substrate such as, for example, a ceramic (e.g., cordierite) or metallic (e.g., kanthal) monolith core which can, for example, define a honeycomb structure. A washcoat can also be used as a carrier material for the catalysts. Such washcoat materials can include, for example, aluminum oxide, titanium dioxide, silicon dioxide, any other suitable washcoat material, or a combination thereof. The exhaust gas (e.g., diesel exhaust gas) can flow over and about the catalyst such that any NOx gases included in the exhaust gas are further reduced to yield an exhaust gas which is substantially free of carbon monoxide and NOx gases.

In one embodiment, a second valve 142 is positioned upstream of the SCR system 150 and downstream of the storage tank 140. The second valve 142 is configured to control a volume of the ammonia gas flowing from the storage tank to the SCR system 150. The second valve 142 can include a solenoid valve, a diaphragm valve, a ball valve or any other suitable valve for controlling the flow of ammonia gas to the SCR system 150. The second control valve 142 can thus be used to meter a flow of the ammonia gas to the SCR system 150 based on one or more operating parameters of the engine and/or the SCR system 150.

The SCR system 150 can be fluidly coupled to the engine to receive the exhaust gas from the engine. The storage tank 130 communicates the ammonia gas into the SCR system 150 which mixes with exhaust gas. Since the exhaust gas and the exhaust reductant (i.e., ammonia gas) are both in gaseous phase, the mixing of the exhaust gas and the exhaust reductant is more efficient relative to conventional aftertreatment systems which provide the exhaust reductant in the form of liquid droplets. Thus the aftertreatment system 100 provides better mixing, improved NOx reduction efficiency and reduces or eliminates exhaust reductant deposits in the SCR system that can reduce the efficiency of aftertreatment systems.

Figure 2:
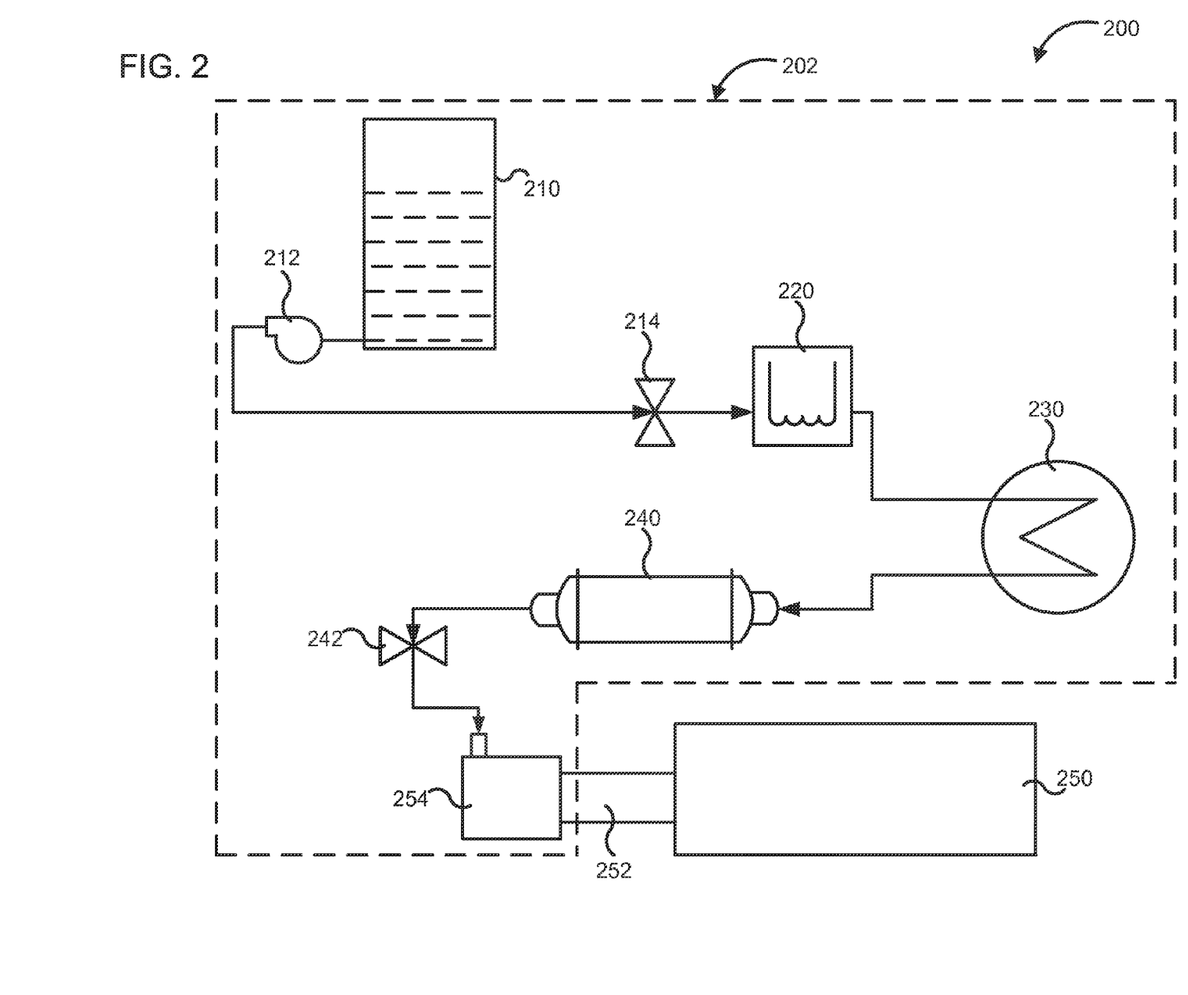
FIG. 2 is a schematic illustration of an aftertreatment system that includes an ammonia gas generation module, according to another embodiment.

In some embodiments, an aftertreatment system can also comprise a mixer for mixing the exhaust gas and ammonia gas. Furthermore, an ammonia gas generation module included in the aftertreatment system can include an ammonia gas feed device for inserting ammonia gas into the SCR system. FIG. 2 shows another embodiment of an aftertreatment system 200. The aftertreatment includes an ammonia gas generation module 202, a mixer 252 and an SCR system 250. The SCR system 250 can be substantially similar to the SCR system 150 and therefore, not described in further detail herein.

The ammonia gas generation module 202 includes an exhaust reductant tank 210, a feedpump 212, a first valve 214, a preheater 220, a heat exchanger 230, a storage tank 240, and a second valve 242. These components are substantially similar to the exhaust reductant tank 110, the feedpump 112, the first valve 114, the preheater 120, the heat exchanger 130, the storage tank 140, and the second valve 142, respectively described with respect to the aftertreatment system 100 and are therefore not described in further detail herein.

The ammonia gas generation module 202 also includes an ammonia gas feed device 254. The ammonia gas feed device 254 is disposed downstream of the storage tank 240 and upstream of the SCR system 250. The ammonia gas feed device 254 can include a chamber which is fluidly coupled to an engine or an exhaust manifold of the engine, and structured to receive an exhaust gas (e.g., diesel exhaust gas) from the engine. The ammonia gas feed device 254 can also include an injector, a nozzle or any other insertion mechanism disposed on a sidewall of the ammonia gas feed device 254. The insertion mechanism is configured to deliver the ammonia gas into a stream of exhaust gas flowing through the chamber into the SCR system 250.

The mixer 252 is positioned downstream of the ammonia gas feed device 254 and upstream of the SCR system 250. The mixer 252 is structured to mix the exhaust gas with the ammonia gas to form a gaseous mixture for delivering to the SCR system 250. The mixer 252 can be structured to allow efficient mixing of the ammonia gas with the exhaust gas before delivering to the SCR system 250 to maximize the efficiency of the SCR system 250. The mixer 252 can include any suitable structures such as, for example, passageways, bluffs, vanes, partition walls, or any other features or structures to facilitate the mixing of the exhaust reductant with the exhaust gas.

Figure 3A:
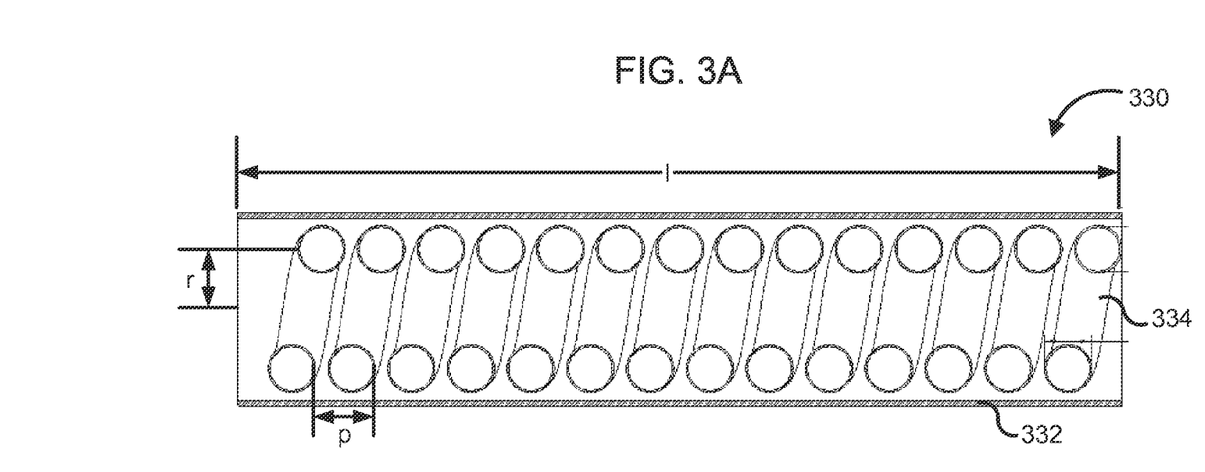
FIG. 3A is a side-cross section view and FIG. 3B is a front view of a shell and tube heat exchanger included in an ammonia gas generation module, according to one embodiment.
Figure 3B:
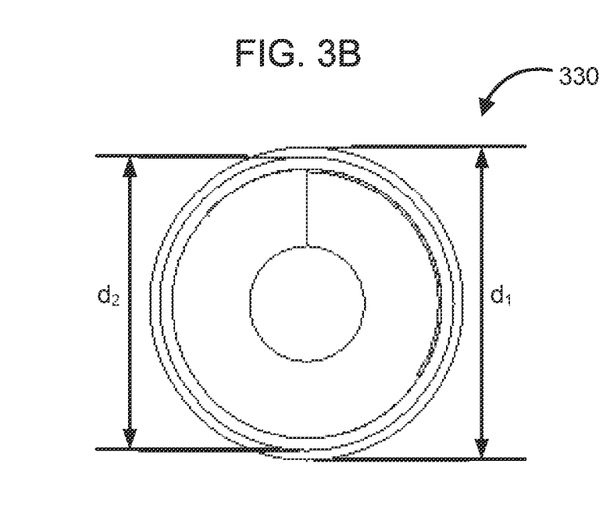

FIG. 3A shows a side cross-section and FIG. 3B shows a front view of a shell and tube heat exchanger 330 that can be used in the ammonia gas generation module 100, 200 or any other ammonia gas generation module described herein. The shell and tube heat exchanger 330 includes a shell 332 and a single spiral tube 334 disposed within the shell 332. The spiral tube 334 is configured to allow counter flow of the liquid exhaust reductant. The heat exchanger 330 has a length 1. Each ring of the spiral tube is separated by a pitch p and the spiral tube 334 has radius r measured from a central axis of the shell 332 to a center point of a flow path spiral tube 334.

The shell 332 is configured to receive an exhaust gas from an EGR system or a coolant from an engine cooling system to heat the exhaust reductant to a temperature greater than 180 degrees Celsius and produce ammonia gas. The shell has an outer diameter $d_1$ and an inner diameter $d_2$. In some embodiments, the inner diameter $d_2$ can be in the range of 70 mm to 100 mm. In other embodiments, the spiral tube 334 can have an outer diameter of 10 mm to 30 mm and a thickness of 0.6 mm to 1.0 mm. In still other embodiments, the heat exchanger 330 can have a thermal efficiency of 45%. Keeping these parameters constant, the length 1 of the heat exchanger can be calculated relative to a temperature of the exhaust gas which is sufficient to allow heating of the exhaust reductant to a temperature greater than 180 degrees Celsius.

For example, in one implementation, the liquid exhaust reductant inlet temperature is 20 degrees Celsius and the exhaust reductant is to be heated to a second temperature of 265 degrees Celsius to produce the ammonia gas. The heat for heating the exhaust reductant is provided by at least a portion of the exhaust gas flowing through the shell 332 around the spiral tube 334. The mass flow rate of the liquid exhaust reductant is 3 kg/hour. The exhaust gas is provided to the heat exchanger at an inlet of the heat exchanger at a temperature (hereinafter "inlet temperature") of 315 degrees Celsius at a mass flow rate of 399 kg/hour. The inner diameter $d_2$ of the shell 332 is 76.2 mm (i.e., 3 inches)

The energy required to raise the temperature of exhaust reductant in order to ultimately volatilize the exhaust is given by the formula:

$$q = m_c C_{pc}(T_{cout} - T_{cin}) + \text{latent heat of vaporisation of water} + \text{latent heat of volatilization of urea.}$$

where $m_c$ is mass flow rate of exhaust reductant, $C_{pc}$ is specific heat, $T_{cout}$ is the temperature of the exhaust reductant on exiting the heat exchanger 330 and $T_{cin}$ is the temperature of the exhaust reductant entering the heat exchanger 330.

According to an assumed efficiency, the heat required from the exhaust gases is calculated, so as to obtain the exit temperatures of exhaust gases. The fluid properties for exhaust gases can be calculated to determine heat transfer coefficient. The formulae used are:

$$V = m/\rho \times A,$$

where V is the velocity of the exhaust gas, m is the mass flow rate, $\rho$ is the density of the exhaust gas, and A is the area of the heat exchanger;

$$Re = V\, Dh/\upsilon,$$

where Re is Reynolds number, Dh is hydraulic diameter of shell 332, and $\upsilon$ is kinematic viscosity of exhaust gas;

$$Pr = \mu Cap/K,$$

where Pr is Prandtl number, $\mu$ is dynamic viscosity of exhaust gas and Kf is thermal conductivity; and $$Nu = 0.023 \times Re0.8 \times Pr0.3,$$

where Nu is the Nusselt number.

The heat transfer coefficient is further calculated using the formula $$h_0 = Nu \times K_f/D_h,$$

The overall heat transfer coefficient is $$(1/U) = 1/h_i + 1/h_0 + L/k,$$

where $h_i$ is the heat transfer coefficient of the exhaust gas at the inlet of the heat exchanger, $h_0$ is the heat transfer coefficient of the exhaust gas at the outlet of the heat exchanger, L is length of the heat exchanger and k is thermal conductivity.

The heat duty is determined using the formula $$Q = m_h C_{ph}(T_{hin} - T_{hout}).$$

The heat transfer area is determined by:

$$A = Q/(U \times LMTD),$$

where LMTD is the log mean temperature difference.

Assuming the diameter of tube and thickness of tubes the length of tube can be calculated as:

$$L = A/(\pi \times d_1) \quad (1)$$

where $d_1$ is the outer diameter of the shell.

The effectiveness of heat exchanger is:

$$\epsilon = (T_{hin} - T_{hout})/(T_{hin} - T_{cout})$$

At the experimented conditions, the heat transfer area required is 0.5892 m². The minimum velocity of the exhaust gas required to achieve this heat transfer at 315 degrees Celsius. Then using equation 1 reveals that the heat exchanger has a length of 149.2 cms. This length is considerably long.

Figure 4:
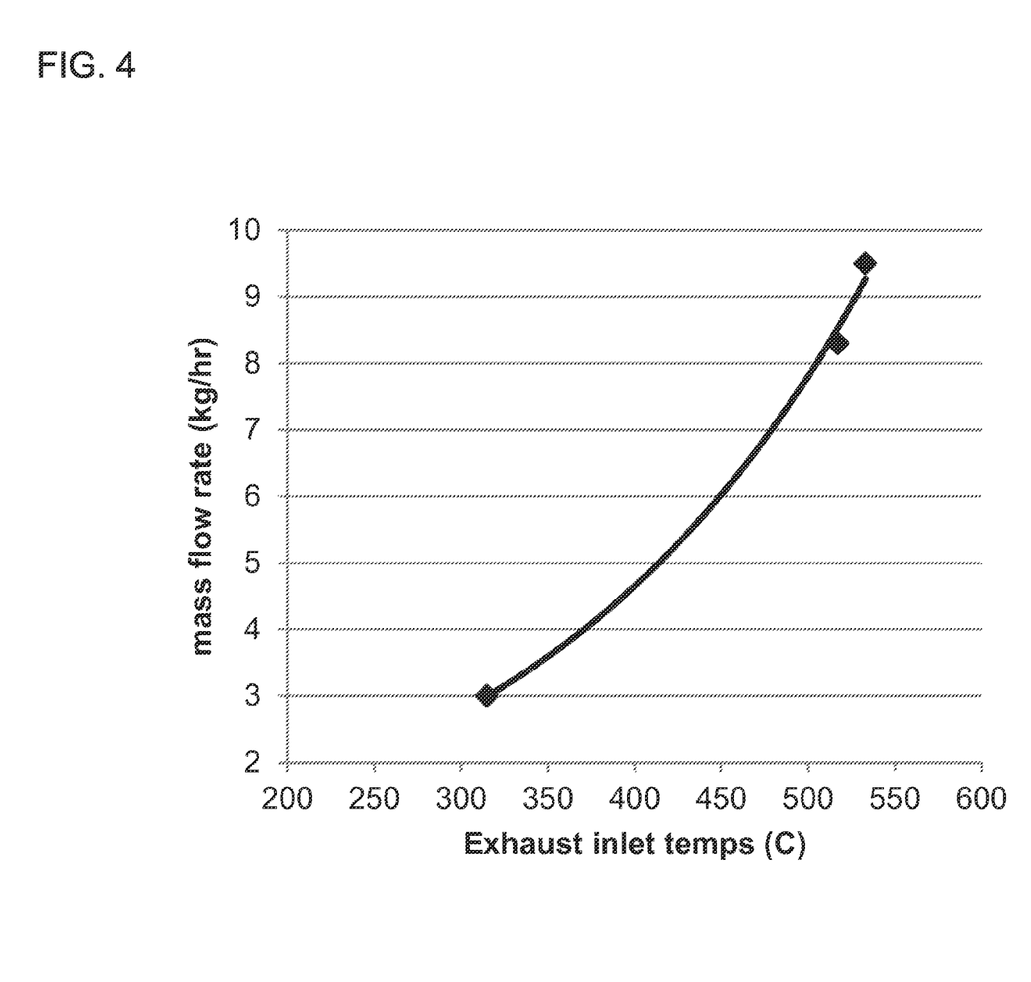
FIG. 4 is a plot of mass flow rate of an exhaust gas versus exhaust inlet temperature of the heat exchanger or FIGS. 3A-B.
Figure 5:
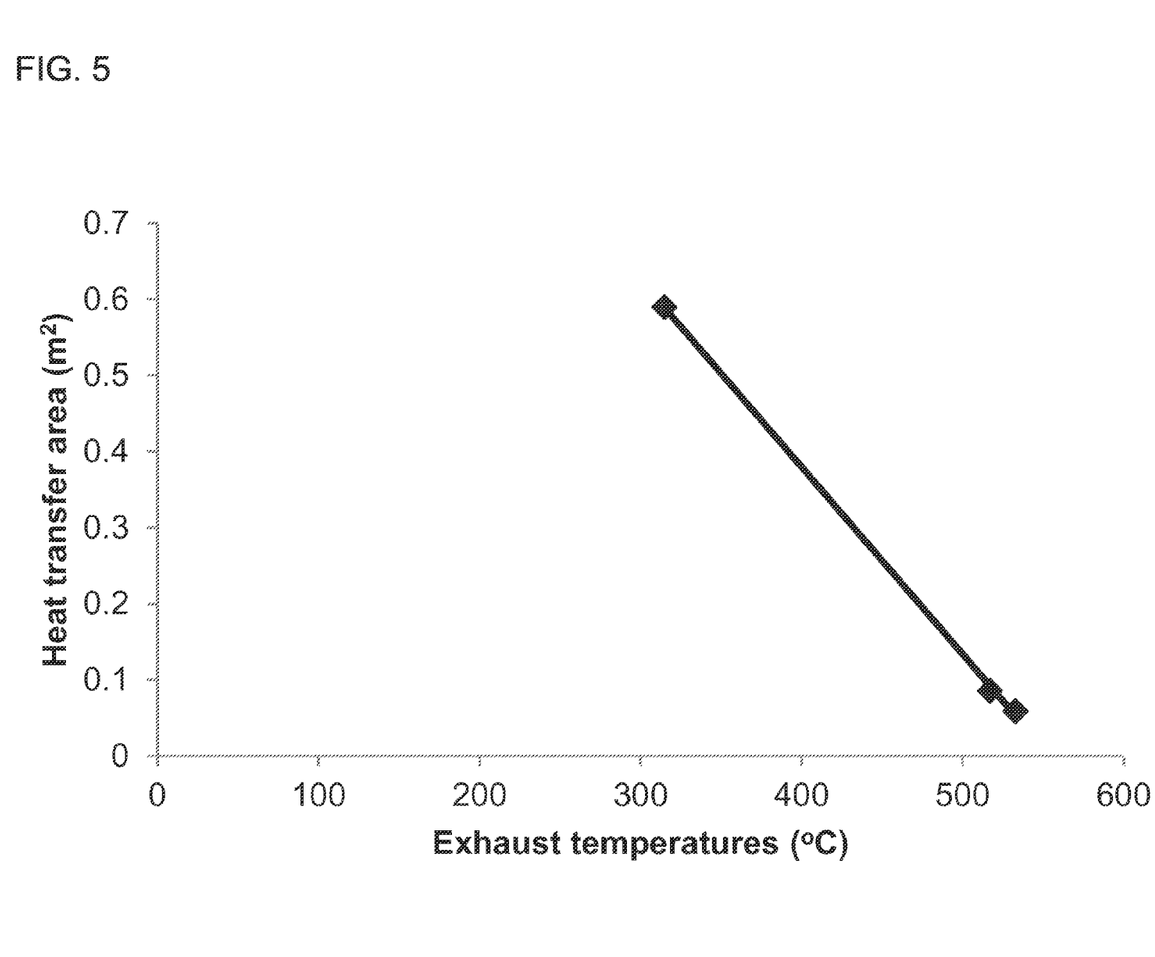
FIG. 5 is a plot of the heat transfer area of the heat exchanger versus exhaust gas temperatures.

The length can be reduced by changing other parameters, for example, the exhaust gas temperature and or mass flow rate. FIG. 4 is a plot of the exhaust gas mass flow rate versus the exhaust inlet temperature. Higher flow rates can lead to higher inlet temperatures. FIG. 5 shows a plot of exhaust temperature versus heat transfer area. As the heat transfer area decreases, the exhaust gas temperature necessary to achieve a desired heat transfer increases.

Figure 6:
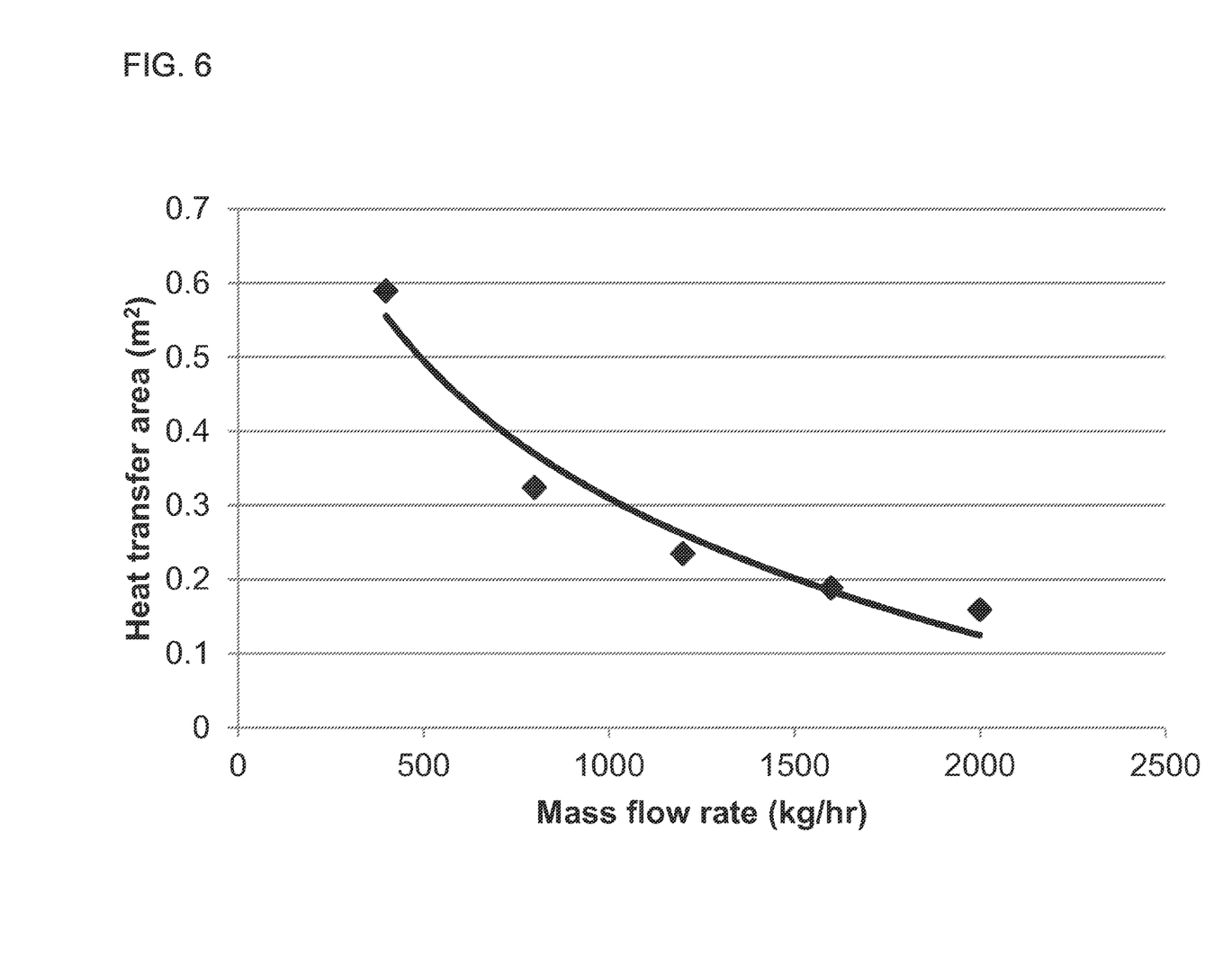
FIG. 6 is a plot of heat transfer area of the heat exchanger versus the mass flow rate of the exhaust gas flowing into the heat exchanger.
Figure 7:
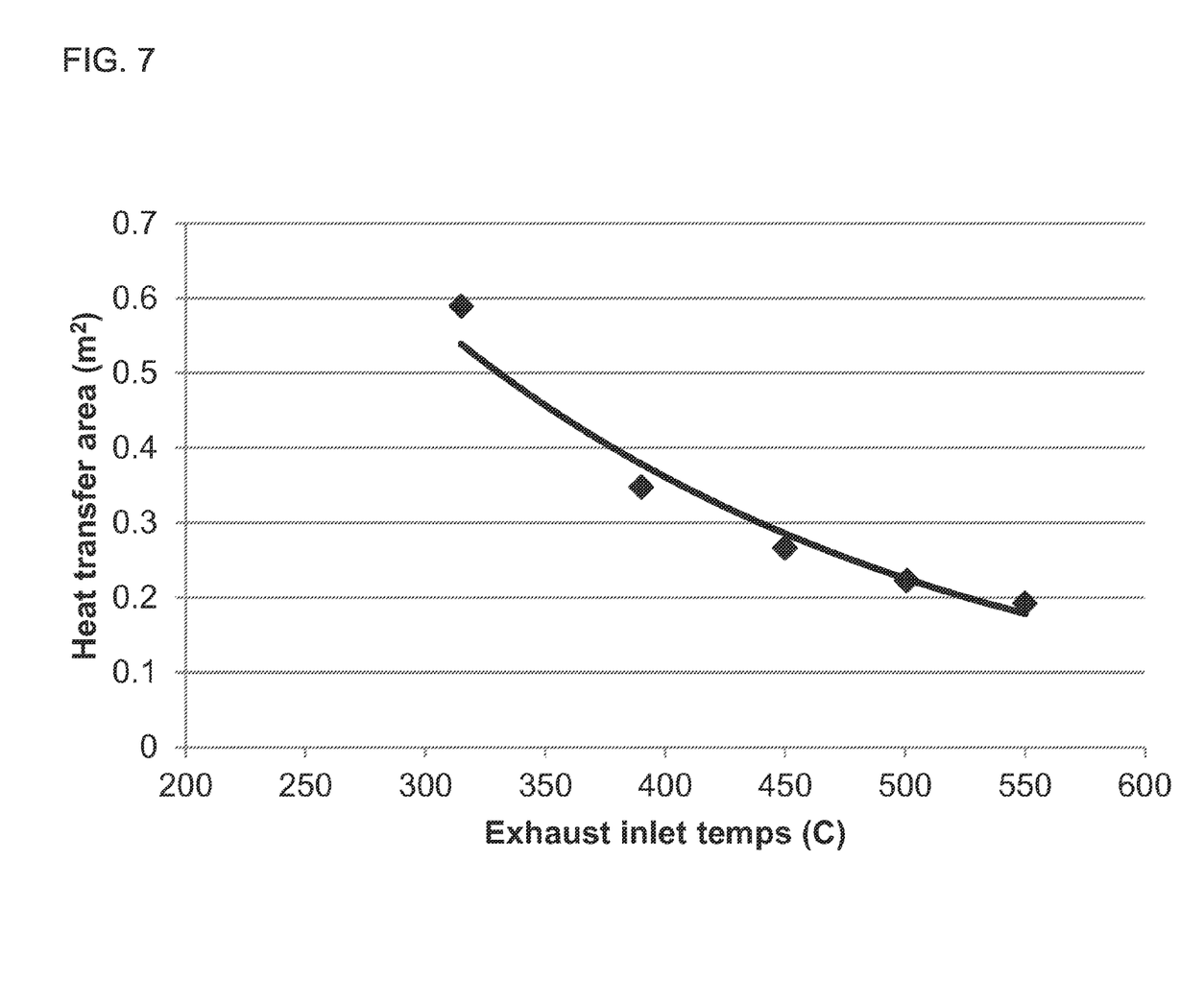
FIG. 7 is a plot of heat transfer area of the heat exchanger versus exhaust inlet temperature.

FIG. 6 is a plot of heat transfer area versus mass flow of exhaust gas. As the heat transfer area decreases the exhaust gas flow rate is increased to achieve the desired heat transfer. FIG. 7 is a plot of heat transfer area versus exhaust inlet temperature. As the heat transfer area decreases, the exhaust inlet temperature for achieving a desired heat transfer increases.

The heat exchanger 330 can be modified or other components can also be added to the heat exchanger 330 to increase the heat transfer area. For example, the outer diameter $d_1$ and/or inner diameter $d_2$ of the heat exchanger 330 can be increased, fins can be provided, a converging tube can be position upstream of the heat exchanger to increase the flow rate of the exhaust gas and/or baffles can be provided to increase the heat transfer coefficient.

Figure 8:
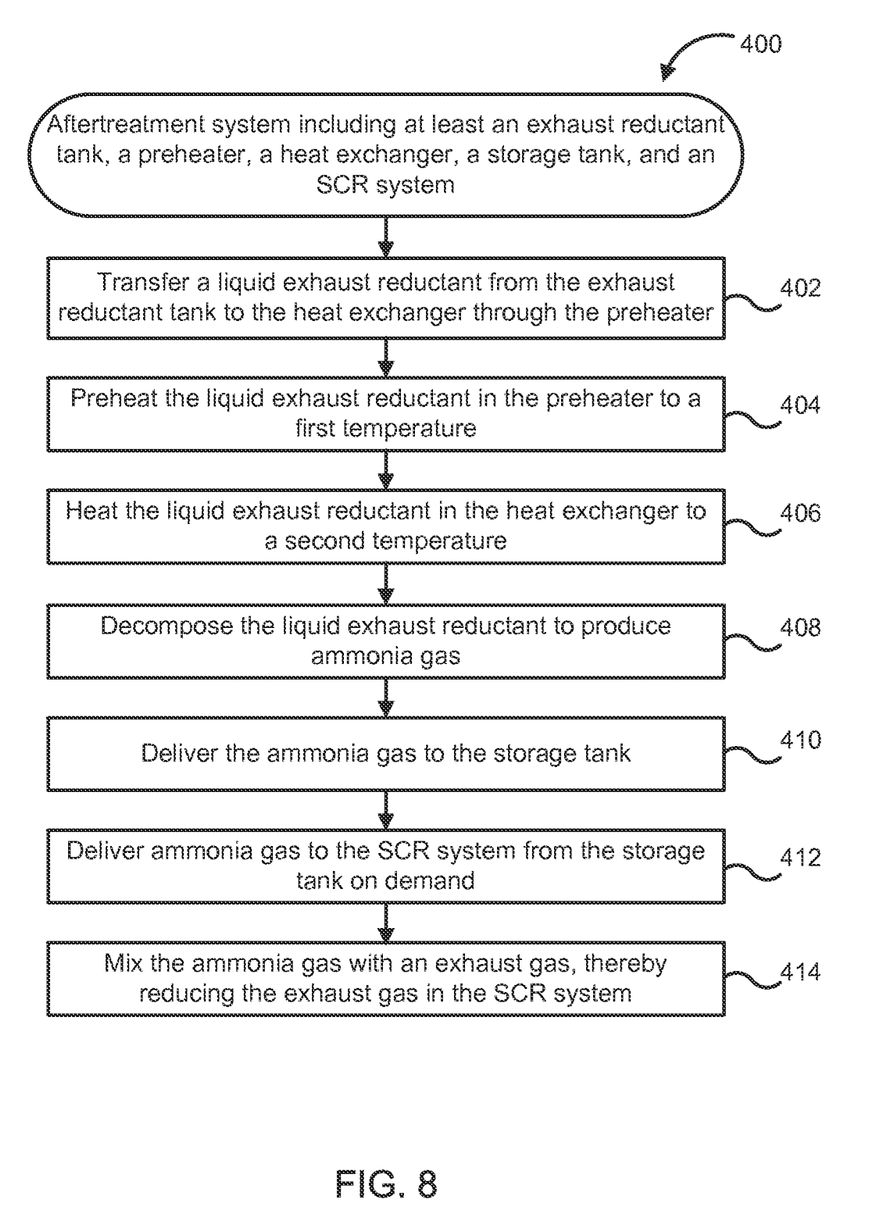
FIG. 8 is a schematic flow diagram of a method for treating an exhaust gas in an aftertreatment system using ammonia generated by an ammonia gas generation module, according to yet another embodiment.

FIG. 8 shows can exemplary method 400 for treating an exhaust gas using an aftertreatment system comprising at least an exhaust reductant tank, a preheater, a storage tank and a SCR system. The aftertreatment system can include the aftertreatment system 100, 200 or any other aftertreatment system described herein.

The method 400 includes transferring a liquid exhaust reductant from the exhaust reductant tank to the heat exchanger through the preheater, at 402. The exhaust reductant tank can include the exhaust reductant tank 110, 210 or any other exhaust reductant tank described herein. The exhaust reductant tank stores the liquid exhaust reductant (e.g., urea, aqueous solution of urea or ADBLUE®). The exhaust reductant can be transferred to the heat exchanger from the exhaust reductant tank by a feedpump, for example the feedpump 112, 212 or any other feedpump described herein.

In one embodiment, a flow of the liquid exhaust reductant to the preheater is controlled via a first valve. The first valve can include the first valve 112, 212 or any other first valve described herein. Thus, the first valve can be used to control a volume of the liquid exhaust reductant flowing to the heat exchanger.

The liquid exhaust reductant is preheated in the preheater to a first temperature, at 404. The preheater can include any suitable preheater, for example an electric heater, a radiation heater or any other heater. The preheater is configured to preheat the liquid, for example to thaw the liquid exhaust reductant or increase the temperature without evaporating the liquid exhaust reductant. In particular embodiments, the first temperature can be in the range of 25 degrees Celsius to 95 degrees Celsius (e.g., about 25 degrees Celsius, 30 degrees Celsius, 40 degrees Celsius, 50 degrees Celsius, 60 degrees Celsius, 70 degrees Celsius, 80 degrees Celsius, 90 degrees Celsius or 95 degrees Celsius inclusive of all ranges and values therebetween).

The liquid exhaust reductant is heated in the heat exchanger to a second temperature, at 406, the second temperature being higher than the first temperature. The heat exchanger can include the heat exchanger 130, 230, 330 or any other heat exchanger described herein. The liquid exhaust reductant is decomposed to produce ammonia gas, at 408. For example, heating the liquid exhaust reductant to the second temperature can be sufficient to decompose the liquid exhaust reductant to generate ammonia gas, as described with respect to the aftertreatment system 100. In particular embodiments, the second temperature can be greater than 180 degrees Celsius (e.g., 185 degrees Celsius, 200 degrees Celsius, 250 degrees Celsius, 300 degrees Celsius, 350 degrees Celsius, 400 degrees Celsius, 450 degrees Celsius, 500 degrees Celsius or 550 degrees Celsius inclusive of all ranges and values therebetween).

In one embodiment, at least a portion of an exhaust gas from an engine exhaust system is communicated to the heat exchanger. The exhaust gas can be at a high enough temperature to provide heat for heating the liquid exhaust reductant to the second temperature, as described with respect to the aftertreatment system 100.

In another embodiment, at least a portion of a coolant from an engine cooling system is communicated to the heat exchanger. The coolant can be at a high enough temperature to provide heat for heating the liquid exhaust reductant to the second temperature, as described with respect to the aftertreatment system 100. In still another embodiment, at least a portion of the engine lubricating oil in the engine lubrication system is communicated to the heat exchange. The lubricating oil can be at a sufficiently high temperature to provide heat for heating the liquid exhaust reductant to the second temperature, as described with respect to the aftertreatment system 100.

The ammonia gas is delivered to the storage tank from the heat exchanger, at 410. The storage tank can include the storage tank 140, 240 or any other storage tank described herein and is configured to store the ammonia gas for delivering to the SCR system. In particular embodiments, the storage tank is configured to store the ammonia gas at a predetermined pressure which is higher than atmospheric pressure.

The ammonia gas is delivered to the SCR system from the storage tank on demand, at 412. The SCR system can include the SCR system 150, 250 or any other SCR system described herein. In one embodiment, a flow of the ammonia gas to SCR system is controlled via a second valve (e.g., the second valve 142 or 242 as described herein). In this manner a metered amount of the ammonia gas can be provided to the SCR system based on one or more operational parameters of an engine producing the exhaust gas or the SCR system.

The ammonia gas is mixed with the exhaust gas, thereby reducing the exhaust gas in the SCR system, at 414. In one embodiment, the ammonia gas can be delivered to an ammonia gas feed device fluidly coupled to the SCR system. The ammonia gas feed device can include, for example the ammonia gas feed device 254 or any other ammonia gas feed device described herein. In another embodiment, a mixer (e.g., the mixer 252) can be fluidly coupled to the ammonia gas feed device and the SCR system. In such embodiments, the mixer is configured to receive the exhaust gas and the ammonia gas from the ammonia gas feed device and facilitate mixing of the exhaust gas and the ammonia gas before delivering to the SCR system.

In this manner, the method 400 can be used to treat exhaust gases by providing ammonia gas which mixes faster and more efficiently with the exhaust gas relative to liquid exhaust reductant droplets. Thus the method 400 can provide aftertreatment systems that provide higher efficiency, consume less energy, and are less costly than aftertreatment systems that use liquid exhaust reductant for treating the exhaust gas.

As used herein, the singular forms "a", "an" and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Additionally, it should be understood that features from one embodiment disclosed herein may be combined with features of other embodiments disclosed herein as one of ordinary skill in the art would understand. Other substitutions, modifications, changes and omissions may also be made in the design, operating conditions and arrangement of the various exemplary embodiments without departing from the scope of the present invention.

What is claimed is:

1. An aftertreatment system, comprising:
   a liquid exhaust reductant tank storing a liquid exhaust reductant;
   a shell and tube heat exchanger positioned downstream of the liquid exhaust reductant tank, the shell and tube heat exchanger comprising a tube in a spiral configuration positioned proximate a shell, the shell and tube heat exchanger heating the liquid exhaust reductant to a temperature sufficient to decompose liquid exhaust reductant therein and produce ammonia gas therefrom;
   a storage tank positioned downstream of the shell and tube heat exchanger, the storage tank structured to store the ammonia gas at a predetermined pressure; and
   a selective catalytic reduction system positioned downstream of the storage tank,
   wherein the shell of the shell and tube heat exchanger is fluidly coupled to an engine cooling system to receive a portion of a coolant from the engine cooling system, the tube in the spiral configuration of the shell and tube heat exchanger is in fluid communication with the liquid exhaust reductant tank, the coolant providing sufficient heat to heat the liquid exhaust reductant to the temperature sufficient to decompose the liquid exhaust reductant and produce the ammonia gas therefrom.

2. The aftertreatment system of claim 1, further comprising a feedpump positioned downstream of the exhaust reductant tank and upstream of the heat shell and tube exchanger.

3. The aftertreatment system of claim 1, wherein the temperature is greater than 180 degrees Celsius.

4. The aftertreatment system of claim 1, further comprising an ammonia gas feed device positioned upstream of the selective catalytic reduction system and downstream of the storage tank, the ammonia gas feed device delivering the ammonia gas into a stream of an exhaust gas being delivered to the selective catalytic reduction system.

5. The aftertreatment system of claim 4, further comprising a mixer positioned downstream of the ammonia gas feed device and upstream of the selective catalytic reduction system, the mixer structured to mix the exhaust gas and the ammonia gas to form a gaseous mixture delivered to the selective catalytic reduction system.

6. The aftertreatment system of claim 1, further comprising
   a preheater positioned downstream of the exhaust reductant tank and upstream of the shell and tube heat exchanger.

7. The aftertreatment system of claim 6, further comprising a valve positioned upstream of the shell and tube heat exchanger and downstream of the exhaust reductant tank, the valve controlling a volume of the liquid exhaust reductant flowing to the preheater.

8. The aftertreatment system of claim 7, wherein the valve is a first valve, and wherein the system further comprises a second valve positioned upstream of the selective catalytic reduction system and downstream of the storage tank, the second valve controlling a volume of the ammonia gas flowing from the storage tank to the selective catalytic reduction system.

9. An ammonia gas generation module comprising:
   a liquid exhaust reductant tank storing a liquid exhaust reductant;
   a preheater positioned downstream of the exhaust reductant tank, the preheater heating the liquid exhaust reductant to a first temperature;
   a shell and tube heat exchanger positioned downstream of the preheater, the shell and tube heat exchanger comprising a tube in a spiral configuration positioned proximate a shell, the shell and tube heat exchanger heating the liquid exhaust reductant to a second temperature sufficient to decompose the liquid exhaust reductant and produce ammonia gas; and
   a storage tank positioned downstream of the shell and tube heat exchanger and in fluid communication with a selective catalytic reduction system, the storage tank structured to store the ammonia gas at a predetermined pressure,
   wherein the shell of the shell and tube heat exchanger is structured to be fluidly coupled to an engine cooling system to receive a portion of a coolant from the engine cooling system, the tube in the spiral configuration of the shell and tube heat exchanger is in fluid communication with the liquid exhaust reductant tank, the coolant providing sufficient heat to heat the liquid exhaust reductant to the second temperature.

10. The module of claim 9, further comprising:
a feedpump positioned downstream of the exhaust reductant tank and upstream of the preheater.

11. The module of claim 9, further comprising:
an ammonia gas feed device positioned downstream of the storage tank, the ammonia gas feed device delivering the ammonia gas into a stream of an exhaust gas being delivered to the selective catalytic reduction system.

12. The module of claim 9, wherein the second temperature is greater than 180 degrees Celsius.

13. The module of claim 9, wherein the preheater is an electric heater.

14. The module of claim 9, wherein the shell and tube provides a counter flow of the liquid exhaust reductant.

15. The module of claim 9, further comprising:
a valve positioned upstream of the preheater and downstream of the exhaust reductant tank, the valve controlling a volume of the liquid exhaust reductant flowing to the preheater.

16. The module of claim 15, wherein the valve is a first valve, the system further comprising:
a second valve positioned downstream of the storage tank, the second valve controlling a volume of the ammonia gas flowing from the storage tank to the selective catalytic reduction system.

17. A method for treating an exhaust gas using an aftertreatment system comprising at least an exhaust reductant tank, a preheater, a shell and tube heat exchanger, a storage tank and a selective catalytic reduction system, the shell and tube heat exchanger comprising a tube in a spiral configuration positioned proximate a shell, the method comprising:

transferring a liquid exhaust reductant from the exhaust reductant tank to the heat exchanger through the preheater;

preheating the liquid exhaust reductant in the preheater to a first temperature;

communicating at least a portion of a coolant from an engine cooling system to the shell of the shell and tube heat exchanger;

heating the liquid exhaust reductant in the tube in the spiral configuration of the shell and tube heat exchanger to a second temperature via heat provided by the coolant;

decomposing the liquid exhaust reductant to produce ammonia gas;

delivering the ammonia gas to the storage tank from the heat exchanger;

delivering the ammonia gas to the selective catalytic reduction system from the storage tank on demand; and mixing the ammonia gas with the exhaust gas, thereby reducing the exhaust gas in the selective catalytic reduction system.

18. The method of claim 17, further comprising:
controlling a flow of the liquid exhaust reductant to the preheater via a first valve.

19. The method of claim 18, further comprising:
controlling a flow of the ammonia gas to the selective catalytic reduction system via a second valve.

* * * * *